UNITED STATES PATENT OFFICE.

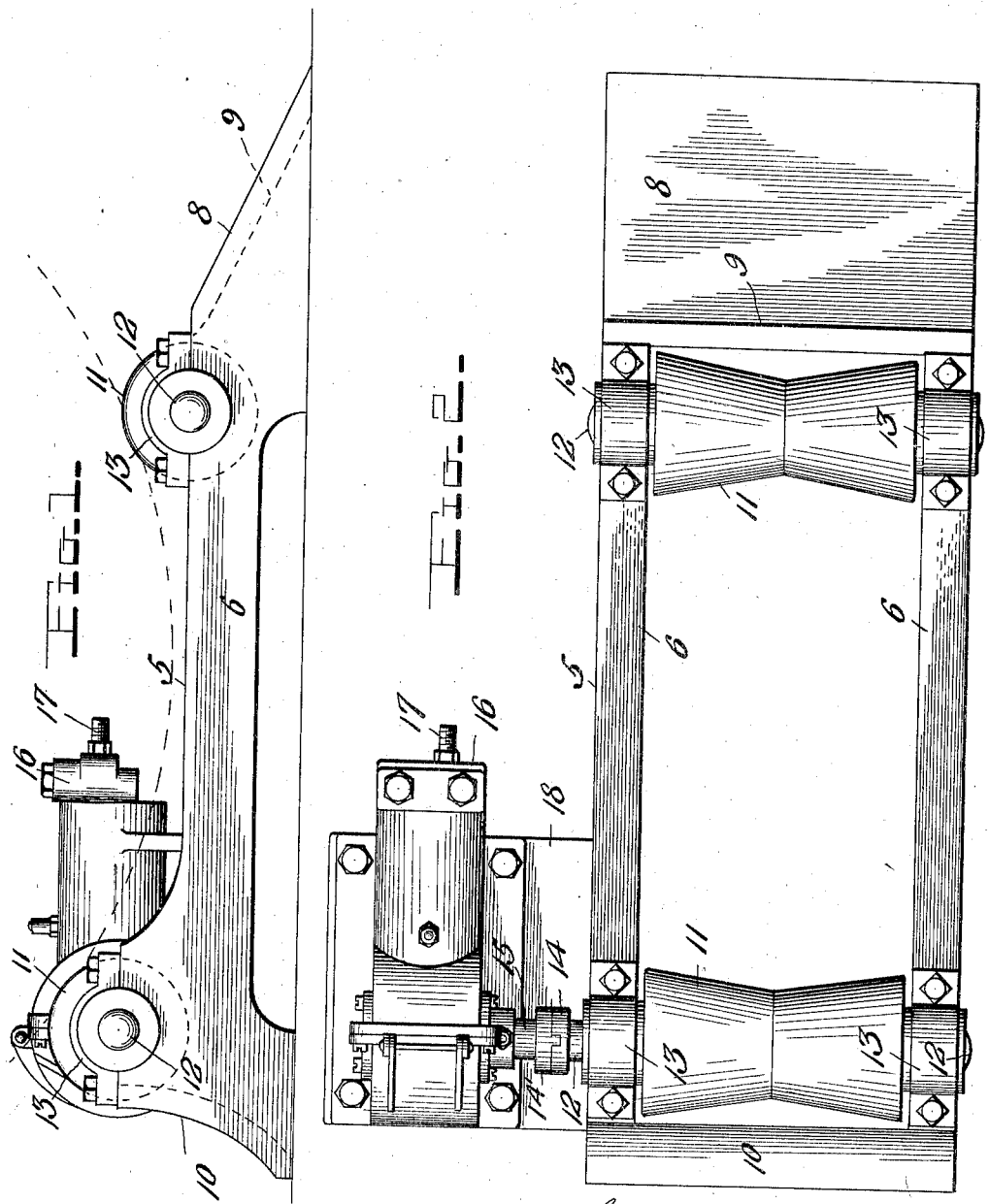

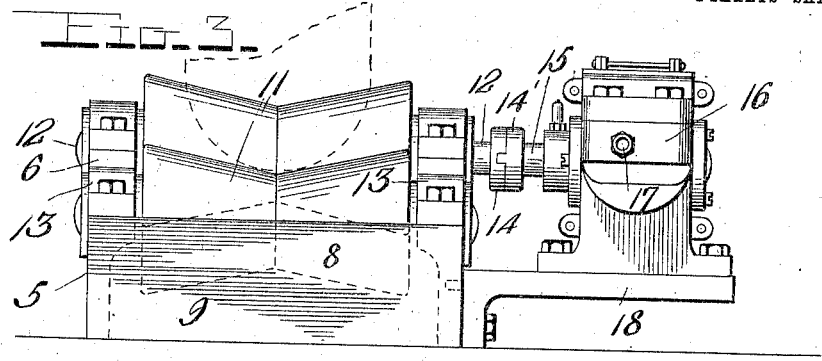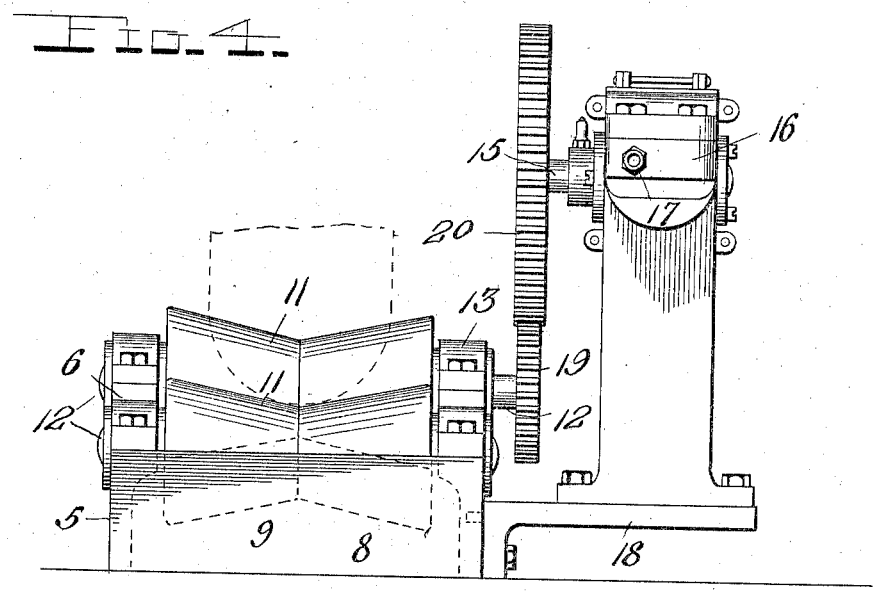

GEORGE S. WELSH AND ZOURIE H. LONG, OF WILKES-BARRE, PENNSYLVANIA.

POWER-TRANSMISSION DEVICE.

967,277.     Specification of Letters Patent.     Patented Aug. 16, 1910.

Application filed October 28, 1909. Serial No. 525,069.

*To all whom it may concern:*

Be it known that we, GEORGE S. WELSH and ZOURIE H. LONG, citizens of the United States, residing at Wilkes-Barre, in the county of Luzerne and State of Pennsylvania, have invented certain new and useful Improvements in Power-Transmission Devices, of which the following is a specification, reference being had to the accompanying drawings.

This invention relates to certain new and useful improvements in power transmission devices, and more particularly to a portable traction power automobile tire pump which is devised with a view to utilizing the traction power of the automobile for operating an air pump, whereby the vehicle tires may be readily inflated.

Another object is to provide a very simple device of the above character which is of such proportions that the same may be conveniently carried on the machine and comprises a base having rollers journaled thereon upon which the rear driving wheel of the motor vehicle is adapted to be positioned, the shaft on one of said rollers being connected to the main shaft of the air pump and adapted to transmit the rotative movement imparted to the rollers through the drive wheel to the air pump, said pump being adapted to have a flexible hose connected thereto and to the tube valve of the tire.

A further object is to provide means whereby the automobile wheel may be readily positioned upon the rollers journaled upon the supporting base of rigid and substantial construction.

With these and other objects in view, the invention consists in the novel construction, combination and arrangement of parts, hereinafter fully described and claimed, and illustrated in the accompanying drawings, in which—

Figure 1 is a side elevation of a device constructed in accordance with our invention; Fig. 2 is a top plan view thereof; Fig. 3 is a front end elevation, and Fig. 4 is a similar view illustrating a slightly modified form of the device showing a means for reducing the speed of the pump shaft.

Referring more particularly to the drawings 5 indicates a base which is preferably formed of hardened steel or aluminum and comprises the parallel side bars 6, the lower edges of which are disposed above the plane of the bottom of the end portions of the base.

The forward ends of the side bars 6 have their upper edges downwardly and forwardly inclined, as shown at 8, and a heavy transverse plate 9 is integrally formed therewith to provide an inclined surface. The rear ends of the side bars 6 are extended above and below the edges thereof to provide the enlarged end portions which are likewise connected by an integral transverse plate 10 which curves rearwardly between its upper and lower ends.

While a supporting base of the above form is deemed preferable for the purposes in view, it will be obvious that various minor changes may be made in the construction of this base to meet the varied requirements which devolve upon a device of this character. The form shown however, is believed to be the best adapted for general use and may be produced at a very moderate cost.

Rollers 11 are disposed between the front and rear ends of the side bars 6, and have rigidly engaged therein and centrally extending beyond their opposite ends, the shafts 12. These shafts are journaled in bearings 13, which may be of any preferred form other than that illustrated in the drawings.

It will be noted from reference to Fig. 2 that the rear roller 11 is of somewhat greater diameter than the forward roller and is disposed above the horizontal plane of the latter. The peripheries of each of these rollers is concave or conically formed upon opposite sides of the longitudinal centers thereof. Thus the periphery of each end of the rollers is inclined and converges inwardly toward the center thereof which provides a roller gradually decreasing in cross sectional area from its ends to its center. By such a construction the resultant friction due to the contact of the periphery of the drive wheel with the periphery of the rollers is reduced to a minimum, while the increased diameter of the rear roller which carries the power shaft and receives the greater amount of this friction, allows for considerable wear of the roller without greatly impairing the efficiency of the device. These rollers would preferably be formed of hard wood so that they could readily be replaced at a trifling expense, while at the same time such construction greatly adds to the lightness of the device and facilitates its easy transportation. One end of the shaft 12 of the rear friction roller 11 is provided with a clutch head 14 which is preferably detachable therefrom and is adapted to have locking engagement with a similar head 14' carried upon the extremity of the pump shaft 15. This shaft extends into the pump casing 16 and is adapted to operate the fans or other pumping mechanism contained therein. As the detailed construction of this pump forms no part of our present invention, the same will not here be set forth in detail. It will suffice to say that the pump is provided with the usual air outlet 17, to which the end of a flexible tube (not shown) is adapted to be connected, the other end of said tube being threaded upon the valve nipple commonly seen in motor vehicle tires to convey the air discharged from the pump to the inner tube of the tire, whereby the same may be rapidly inflated in a much more efficient manner and with the utilization of considerably less power than is possible with devices of this character as previously constructed.

In the operation of the device, the supporting base 5 is positioned under one of the rear wheels of the automobile or other driving vehicle, the forward inclined end thereof being positioned centrally beneath the tire tread. Upon the reversal of the transmission gearing of the machine, the drive wheel will move forwardly and upwardly on the base 5 and be positioned upon the peripheries of the friction rollers 11. The motor of the machine may now be operated at full speed if desired, and upon the rotation of the drive wheel rotary motion will be transmitted through the rear roller 11 and the power shaft 12 to the shaft 15 of the air pump, whereupon the air will be forced therefrom through the flexbile connecting tube into the inner tire tube. By providing rollers having concaved peripheries, two separate bearing points of the tire tread thereon are secured, one upon each side of the longitudinal center of the rollers. As the rear roller is positioned on a higher plane above the base than the forward roller, the greatest weight of the machine will be sustained thereby and consequently the frictional engagement between said roller and the vehicle wheel will also be greater. It is for this reason that the rear roller is heavier than the forward roller. Such a construction also has the additional advantage that if the energy of the motor is at a low ebb, it will require but a small fraction of its remaining power to operate the air pump, the roller being constructed of wood insuring its firm frictional engagement with the tread of the drive wheel.

From the foregoing it will be seen that we have provided a power transmission device which is peculiarly adapted for the purposes above outlined, and is of such construction that the full power of the motor of the vehicle may be utilized when it is desired to very quickly inflate the wheel tires in cases of emergency.

The device is designed with a view to sustaining the highest power motor vehicles without affecting its efficiency and operation. The speed of the operation of the pump may be regulated by the regulation of the motor of the machine.

It will be noted from Fig. 3 that a base plate 18 is bolted or otherwise secured to one side of the base 5, upon which the pump is mounted. This base plate is provided for the purpose of elevating the pump so that its shaft will be disposed in longitudinal alinement with the power shaft of the rear roller 11. It also provides a firm level base for the pump, which as will be obvious may not at all times be found upon the roadways where the device may be used.

In Fig. 4 there is shown a slightly modified form of means for transmitting the power from the roller shaft to the pump shaft. In this construction the revolutions of the shaft 12 is imparted to the pump shaft in reduced ratio through the pinion 19 and the gear 20 which are secured upon the ends of the respective shafts. If desired, this gear and pinion may be removable from their shafts so that others of varying diameters may be placed thereon and the proportionate speed of said shafts regulated, as may be found desirable.

By the use of the device above described it is unnecessary to "jack up" or elevate the rear end of the vehicle as is necessary with other devices of this character whereby the power may be taken from the drive wheel, as the rollers are adapted to sustain the rear end of the machine, as well as to transmit power from the rotating drive wheel. As few elements are employed in its construction, it will be obvious that the cost of manufacture is thus reduced to a minimum. It is likewise compactly arranged and may be conveniently carried on the vehicle.

While we have shown and described what we believe to be the preferable embodiment of our invention, it will be obvious that numerous minor modifications within the scope of the claims may be resorted to without materially departing from the essential features or sacrificing any of the advantages of our invention.

Having thus described the invention what is claimed is:

A device of the character described comprising a supporting base consisting of parallel longitudinal bars, a transverse plate integrally formed with said bars at their forward ends and inclined downwardly and outwardly between their upper and lower edges, the rear ends of said longitudinal bars being enlarged and extending above the plane of their upper edges, a transverse plate connecting said bars at their rear ends, a friction roller mounted in bearings upon said bars at their forward ends, a friction roller mounted in bearings upon the enlarged rear ends of said bars, said last named roller being disposed above the plane of the forward roller and having its shaft extended beyond one of the side bars, each of said rollers being conically formed and converging inwardly toward its longitudinal center to provide a bearing point on each side thereof, a transversely extending supporting plate secured to one of the side bars beneath the rear roller shaft, an air pump arranged upon said plate, the extended shaft of the rear roller and the shaft of the air pump being disposed in the same transverse plane, and means coöperatively connecting said shafts, substantially as and for the purpose set forth.

In testimony whereof we hereunto affix our signatures in the presence of two witnesses.

GEORGE S. WELSH.
ZOURIE H. LONG.

Witnesses:
C. M. FORREST,
M. C. LYDDANE.